(12) United States Patent
Shauli et al.

(10) Patent No.: US 10,296,439 B1
(45) Date of Patent: May 21, 2019

(54) SYSTEM, METHOD, AND COMPUTER PROGRAM FOR DOCUMENTATION, COMMUNICATION, PLANNING AND CONTROL OF SOFTWARE APPLICATIONS THAT SUPPORT BUSINESS NEEDS

(71) Applicant: Amdocs Development Limited, Limassol (CY)

(72) Inventors: Nitsa Shauli, Kfar Saba (IL); Yaakov Blanca, Herzliya (IL); Regina Elbert, Kfar Saba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/816,961

(22) Filed: Nov. 17, 2017

(51) Int. Cl.
G06F 9/44 (2018.01)
G06F 11/36 (2006.01)

(52) U.S. Cl.
CPC ................. G06F 11/3612 (2013.01)

(58) Field of Classification Search
CPC .................................................. G06F 11/3612
USPC .................................................. 717/120–131
See application file for complete search history.

(56) References Cited

U.S. PATENT DOCUMENTS

| | | | |
|---|---|---|---|
| 7,167,865 B1 * | 1/2007 | Tharp | G06Q 10/10 |
| 7,360,201 B2 * | 4/2008 | Srivastava | G06Q 10/06 |
| | | | 717/101 |
| 7,409,679 B2 * | 8/2008 | Chedgey | G06F 8/75 |
| | | | 717/127 |
| 7,739,292 B2 | 6/2010 | Falk et al. | |
| 7,895,572 B2 | 2/2011 | Stienhans | |
| 7,949,992 B2 * | 5/2011 | Andreev | G06F 8/10 |
| | | | 709/223 |
| 7,971,180 B2 * | 6/2011 | Kreamer | G06Q 10/06 |
| | | | 717/101 |
| 8,006,223 B2 * | 8/2011 | Boulineau | G06F 8/20 |
| | | | 705/7.22 |
| 8,032,404 B2 * | 10/2011 | Lee | G06Q 10/063118 |
| | | | 705/7.17 |
| 8,055,606 B2 * | 11/2011 | Kreamer | G06Q 10/06 |
| | | | 705/7.12 |
| 8,433,782 B2 | 4/2013 | Phukan | |
| 8,522,217 B2 * | 8/2013 | Dutta | G06F 11/3612 |
| | | | 717/127 |

(Continued)

OTHER PUBLICATIONS

Kumar et al, "A Rule-based Recommendation System for Selection of Software Development Life Cycle Models", ACM SIGSOFT Software Engineering Notes, vol. 38, No. 4, pp. 1-6, 2013 (Year: 2013).*

(Continued)

*Primary Examiner* — Anil Khatri
(74) *Attorney, Agent, or Firm* — Zilka-Kotab, P.C.

(57) ABSTRACT

A system, method, and computer program product are provided for control of a software project that supports business needs. In operation, a multi-layer architecture for the software project is defined based on software elements associated with the software project. Additionally, associations between each business requirement of a plurality of business requirements and the software elements that cover each of the business requirements are stored. Deletion of one or more of the software elements is prevented based on the inter-dependencies of the one or more of the software elements and based on one or more of the business requirements associated with the one or more of the software elements.

14 Claims, 14 Drawing Sheets

(56) References Cited

U.S. PATENT DOCUMENTS

| | | | |
|---|---|---|---|
| 8,630,882 B2 | 1/2014 | Isom | |
| 8,739,128 B1 * | 5/2014 | Cohen | G06F 11/3672 |
| | | | 717/124 |
| 8,898,623 B2 * | 11/2014 | Zhao | G06F 21/604 |
| | | | 717/105 |
| 8,959,481 B2 | 2/2015 | Anand et al. | |
| 9,026,998 B2 * | 5/2015 | Mizrahi | G06F 11/368 |
| | | | 717/124 |
| 9,135,145 B2 * | 9/2015 | Voccio | G06F 11/3612 |
| 9,182,994 B2 * | 11/2015 | Schlarb | G06F 9/44 |
| 9,383,900 B2 | 7/2016 | Flores et al. | |
| 9,411,556 B1 * | 8/2016 | Cawley | G06F 16/2237 |
| 9,652,568 B1 * | 5/2017 | Tzelnic | G06F 17/5022 |
| 2017/0010787 A1 | 1/2017 | Ranganathan et al. | |

OTHER PUBLICATIONS

Uddin et al, "UMLtrust: Towards Developing TrustAware Software", ACM, 831-836, 2008 (Year: 2008).*

Chao et al, "Modeling and Design Monitor Agent Using Layered Control Architecture", ACNm, pp. 1254-1259, 2002 (Year: 2002).*

Purjit et al, "Dependency Related Parameters in the Reconstruction of a Layered Software Architecture", ACM, pp. 1-7. 2016 (Year: 2016).*

Mos et al, "Multi-Layer Perspectives and Spaces in SOA", ACM, pp. 69-74, 2008 (Year: 2008).*

Khatri et al, "A Software Reuse Reference Model Approach in Developing an Automated Educational System for Patients Health Care Management", ACM, pp. 675-678, 2001 (Year: 2001).*

* cited by examiner

FIGURE 9

SYSTEM, METHOD, AND COMPUTER PROGRAM FOR DOCUMENTATION, COMMUNICATION, PLANNING AND CONTROL OF SOFTWARE APPLICATIONS THAT SUPPORT BUSINESS NEEDS

FIELD OF THE INVENTION

The present invention relates to software that automates the build-up and controls of complex software elements, which create automated solution, information models, technology related elements, and business architecture for applications implemented, configured, and customized (changed) specifically per customer/enterprise needs.

BACKGROUND

Software vendors that serve dynamic and diversified businesses with generic (baseline) software (products), which can be configured and customized per the specific needs of each customer (business organization/enterprise) and per the different change management cycles (timelines/timing), often face multiple challenges in various dimensions, which turns the architecture build-up and later roll-out from baseline (core) development to customer specific configuration, customization, implementation, and to production operations into a very cumbersome, inefficient and error prone process.

The dimensions of complexity is derived from multiple factors, such as: 1) diversity and multiple software architecture elements; 2) the dynamic and frequent nature of the need for changes; 3) the need to identify changes to core (baseline) software elements and customer specific elements (for core upgrades and backward compatibility); 4) the need to synchronize and govern changes from development to production; 5) inter-dependencies between architecture elements and layers and cross elements impacts; and 6) multi-user/multi-role operational environments.

There is thus a need for addressing these and/or other issues associated with the prior art.

SUMMARY

A system, method, and computer program product are provided for documentation, communication, planning, and control of software applications that support business needs. In operation, a system identifies a software project. The system receives software element information corresponding to software elements associated with the software project. The system defines at least one architecture for the software project based on the software element information and stores the at least one architecture in a central architecture repository. The system maintains architecture governance of the at least one architecture across a project lifecycle of the software project. Additionally, the system provides controls for definition of multiple layers of the at least one architecture, from core architecture definition through a customer project. Further, the system defines and tracks key performance indicators associated with a customer implementation as part of architecture elements corresponding to the at least one architecture.

BRIEF DESCRIPTION OF THE DRAWINGS

FIG. 9 shows a user interface illustrating traceability features of the system, in accordance with one embodiment.

DETAILED DESCRIPTION

Figure 1:
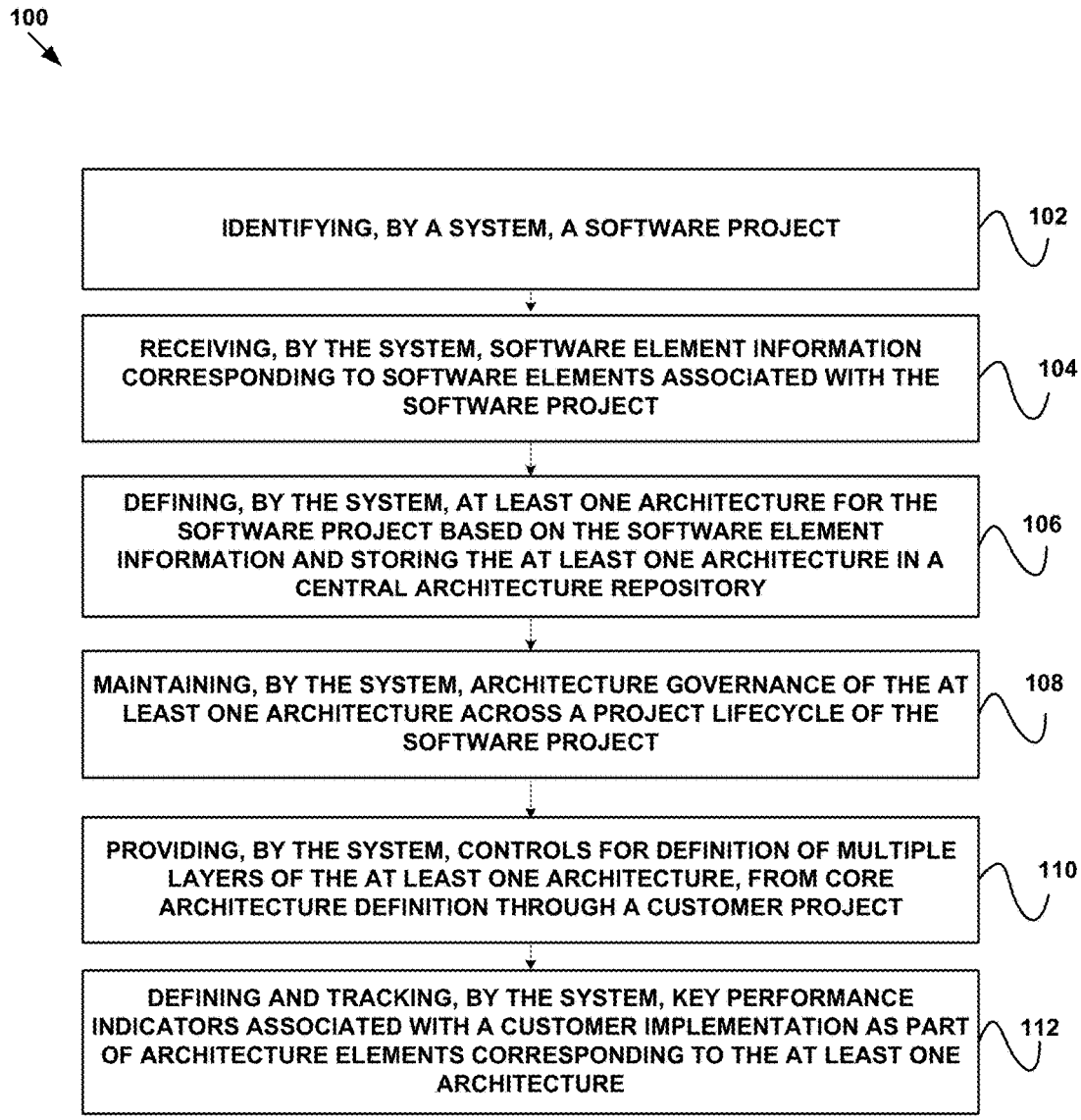
FIG. 1 illustrates a method for documentation, communication, planning, and control of software applications that support business needs, in accordance with one embodiment.

FIG. 1 illustrates a method 100 for documentation, communication, planning, and control of software applications that support business needs, in accordance with one embodiment.

In operation, a system identifies a software project. See operation 102. The software project may be associated with any industry, such as the telecommunication industry. The software project may be associated with any type of computer code, application, and/or software. In one embodiment, the software project may be a combination of core software modules/products with customization and implementation layers.

The system receives software element information corresponding to software elements associated with the software project. See operation 104. The software elements may include any element, such as applications, capabilities, functions, information data models, interfaces, services signatures, versions, software vendor creators, hardware elements, engines, and/or foundations, etc. The software element information may include any information associated with the software elements.

In one embodiment, the software elements may be loaded from one or more existing files. For example, the system may provide load/unload utilities where the system may load architecture elements from various existing/other sources. In one embodiment, the load/unload utilities may offer seamless interfaces to all tools able to communicate via XML, Excel, MS-Word, Adobe, etc.

The system defines at least one architecture for the software project based on the software element information and stores the at least one architecture in a central architecture repository. See operation 106. The system maintains architecture governance of the at least one architecture across a project lifecycle of the software project. See operation 108. Thus, the system manages inter-dependencies between the software elements. Further, the system may provide a visualization layer that highlights inter-dependencies between the software elements (e.g. utilizing a graphical user interface, etc.) and/or logical errors (e.g. modules without any interface or removal of an element which may impact all or some of the related elements associated with it).

Additionally, the system provides controls for definition of multiple layers of the at least one architecture, from core architecture definition through a customer project. See operation 110. Further, the system defines and tracks key performance indicators (KPIs) associated with a customer implementation as part of architecture elements corresponding to the at least one architecture. See operation 112.

In one embodiment, the system may analyze cross element impacts associated with the software elements for evaluating a proposed change associated with the at least one architecture.

The system may be utilized to manage functional elements (e.g. applications, interfaces, business requirements, business processes, etc.) and governance elements (e.g. risks, open issues, effort, volumes, capacity. etc.). In addition, the system may implement a layered approach to architectures, enabling multiple units to contribute to the architecture, each introducing a release that is incorporated into the architecture and native utilities for overlaying architecture releases to discover changes across a timeline. Thus, in one embodiment, the system may provide a user interface for overlaying architecture releases to discover changes across a timeline.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
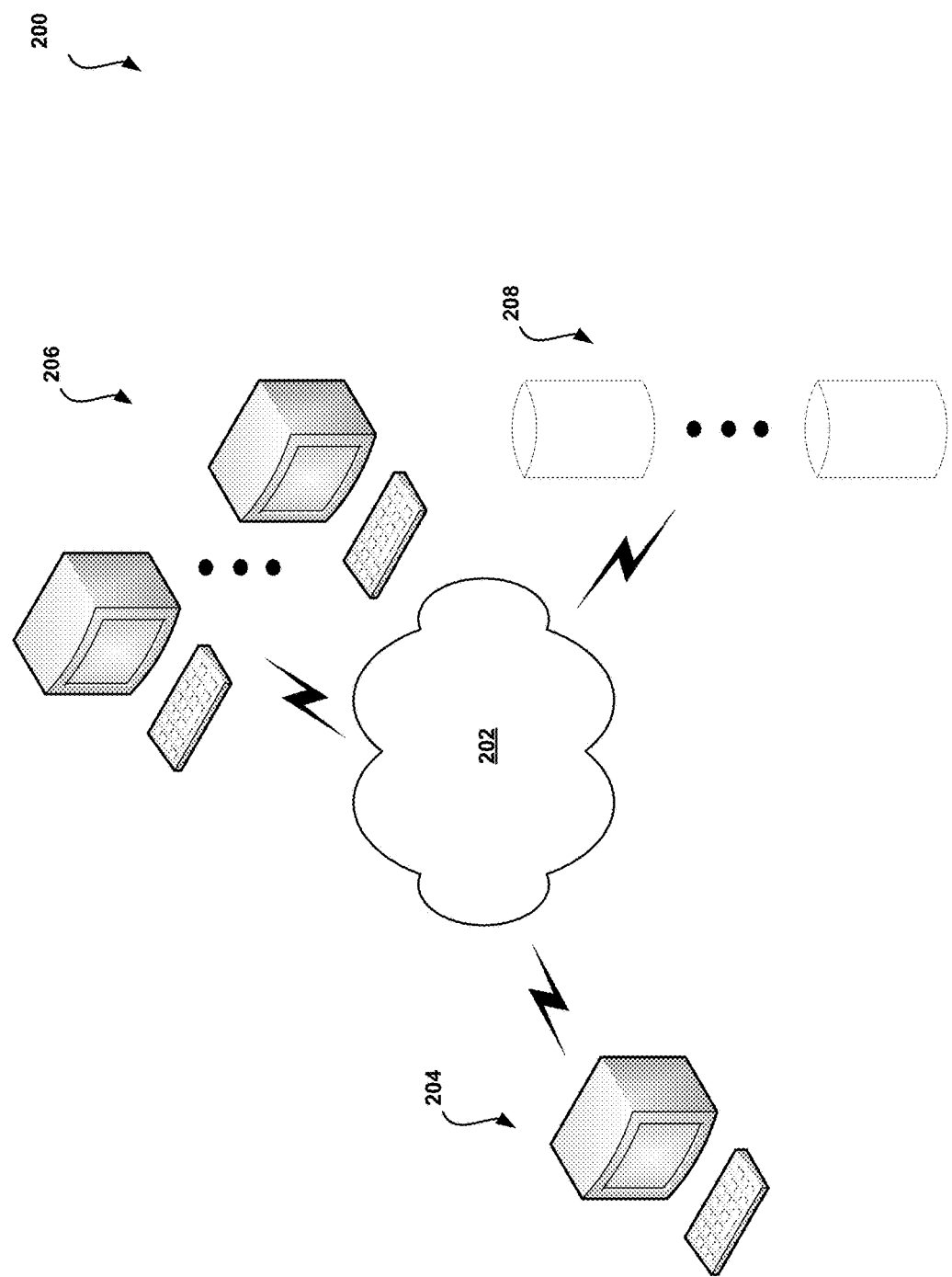
FIG. 2 shows a system flow diagram for documentation, communication, planning, and control of software applications that support business needs, in accordance with one embodiment.

FIG. 2 shows a system 200 for documentation, communication, planning, and control of software applications that support business needs, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206 (e.g. telecommunication systems, etc.), either directly or over one or more networks 202, for providing documentation, communication, planning, and control of software applications that support business needs. The system 204 may also be in communication with one or more repositories/databases 208.

Software vendors who serve dynamic and diversified businesses with generic (baseline) software, which can be configured and customized per the specific needs of each customer and per the different change management cycles (timelines/timing), often face multiple challenges in various dimensions, which turns the architecture build-up and later roll-out from baseline (core) development to customer specific configuration, customization and implementation and to production operations into a very cumbersome, inefficient and error prone process.

The dimensions of complexity is derived from multiple factors, such as: 1) diversity and multiple software architecture elements (e.g. functions, information models, interfaces, service signatures and APIs, versions, software vendor creators, hardware elements, engines, foundations, etc.); 2) the dynamic and frequent nature of the need for changes; 3) the need to identify changes to core (baseline) software elements and customer specific elements; 4) the need to synchronize and govern changes from development to production; 5) inter-dependencies between architecture elements and layers and cross elements impacts; and 6) multi-users/multi-role operational environments.

Due to the interdependencies between the objects (software elements) of the architecture, it important to model these interdependencies in a database, which can be wrapped by a visualization layer that will highlight and bring up these relationships to users (e.g. architects, etc.) and allow analysis of cross elements impact when considering a change (e.g. when removing/replacing a software module, all associated capabilities, functions, data model elements, interfaces, business processes, are removed with it and therefore needs to be replaced, etc.).

The system 204 enables users (e.g. solution architects) to associate the solution software elements (e.g. applications, capabilities, functions, information data models, etc.) to business requirements and business drivers that reflect the needs that a given software architecture will address and automate.

This association enables easy multi-directional navigation to discover information such as: 1) the business requirements that are covered by software elements; and/or 2) the software elements that are needed to comply with any given business requirement. 3) The estimated cost or effort needed to adhere to the business requirements that are not covered by the baseline (core) software. This is imperative to insure that a solution complies with customer (e.g. Enterprise, Service Provider, etc.) needs.

The system 204 allows for a full architecture lifecycle management of projects including: utilizing a central architecture repository and corresponding set of tools that enable architecture governance across a project lifecycle; controls for definition of multiple layers of the architecture, from core architecture definition through customer project including customer project various phases; and defining and tracking of KPIs related to customer implementation as part of the architecture elements.

In one embodiment, the system 204 may define KPIs on a MetaModel level as yet another architecture element. In turn, the MetaModel may be connected to any other elements that may have a contribution or that affect a particular KPI. MetaModel functionality enables the system 204 to apply a formula calculation for each and every connection of the KPI, thus enabling application of weights to the KPI and assessing of the overall architecture impact on a given KPI or set of KPIs. This capability may be used to assess the Return On Investment (ROI) for an enterprise transformation project.

MetaModel functionality also allows the ability to provide users of the system 204 with multiple graphical representations such as lists and multiple graphical layouts (e.g. hierarchical trees, element network, business process view, etc.). Additionally, MetaModel functionality enables the users to query the architecture elements in various dimensions in real-time, including direct and indirect connections.

The system 204 ensures that the architecture built for a specific customer will be sustainable across time. This capability may be achieved by the system 204 while constantly maintaining the network of connections between architecture elements. For example, the system 204 is able to alert/prevent cases where a system capability or a customer business requirement is jeopardized merely because a connection to one application is erased, thus creating a ripple effect to subsequent connections to other architecture elements such as a business requirement or a capability.

The system 204 also introduces an on-going tracking and governance for architecture alignment. This functionality may be implemented by the system 204 utilizing various computer programs and/or hardware to facilitate architecture planning and governance throughout the project lifecycle.

The system 204 may include multiple dimensions and a network of connections to create the context of the architecture. Layers of code built by various groups from research and development to customer implementation may be supported by the system 204. In addition, layers that build an architecture (e.g. business drivers, business requirements, IT architecture, functional architecture, operational aspects, etc.) may be maintained and connected by the system 204 and releases may be defined to provide the time-line context, etc.

This multidimensional set of connections implemented by the system 204 enables governing of the inter-dependencies between any given elements in the software model to other queried elements. The implementation of the system/method/computer program described herein and the ability of the system 204 to build the architecture in a "layer upon layer" approach allows for transporting and enriching the architecture and customer information/metadata along and across the core architecture building process, from core to sales, from sale to construct, from construct to operations.

Figure 3:
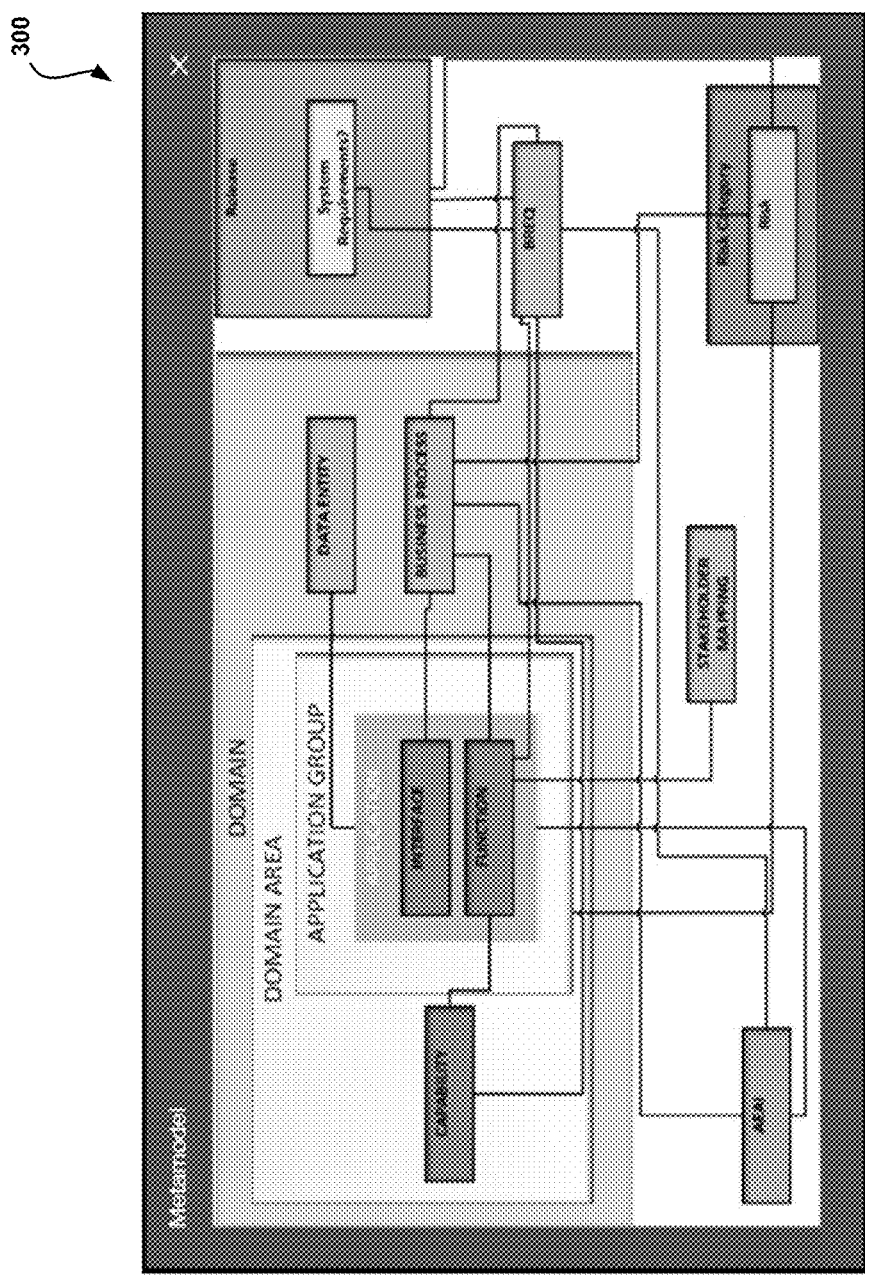
FIG. 3 shows an interface for definition and visualization of an architecture MetaModel, in accordance with one embodiment.

FIG. 3 shows an interface 300 for definition and visualization of an architecture MetaModel, in accordance with one embodiment. As an option, the interface 300 may be implemented in the context of the details of the previous figures and/or any subsequent figure(s). Of course, however, the interface 300 may be implemented in the context of any desired environment. Further, the aforementioned definitions may equally apply to the description below.

The MetaModel is the definition of the singular architecture language. Through the MetaModel unique definition, a user may define the elements to be used in the architecture (i.e. words of the language) as well as the associations between the various elements (i.e. association/semantics of the language). Elements and associations provide the building blocks upon which any architecture is built. The MetaModel may be extended at any time during the architecture lifecycle without affecting or interfering with the existing structures of the architecture.

Figure 4:
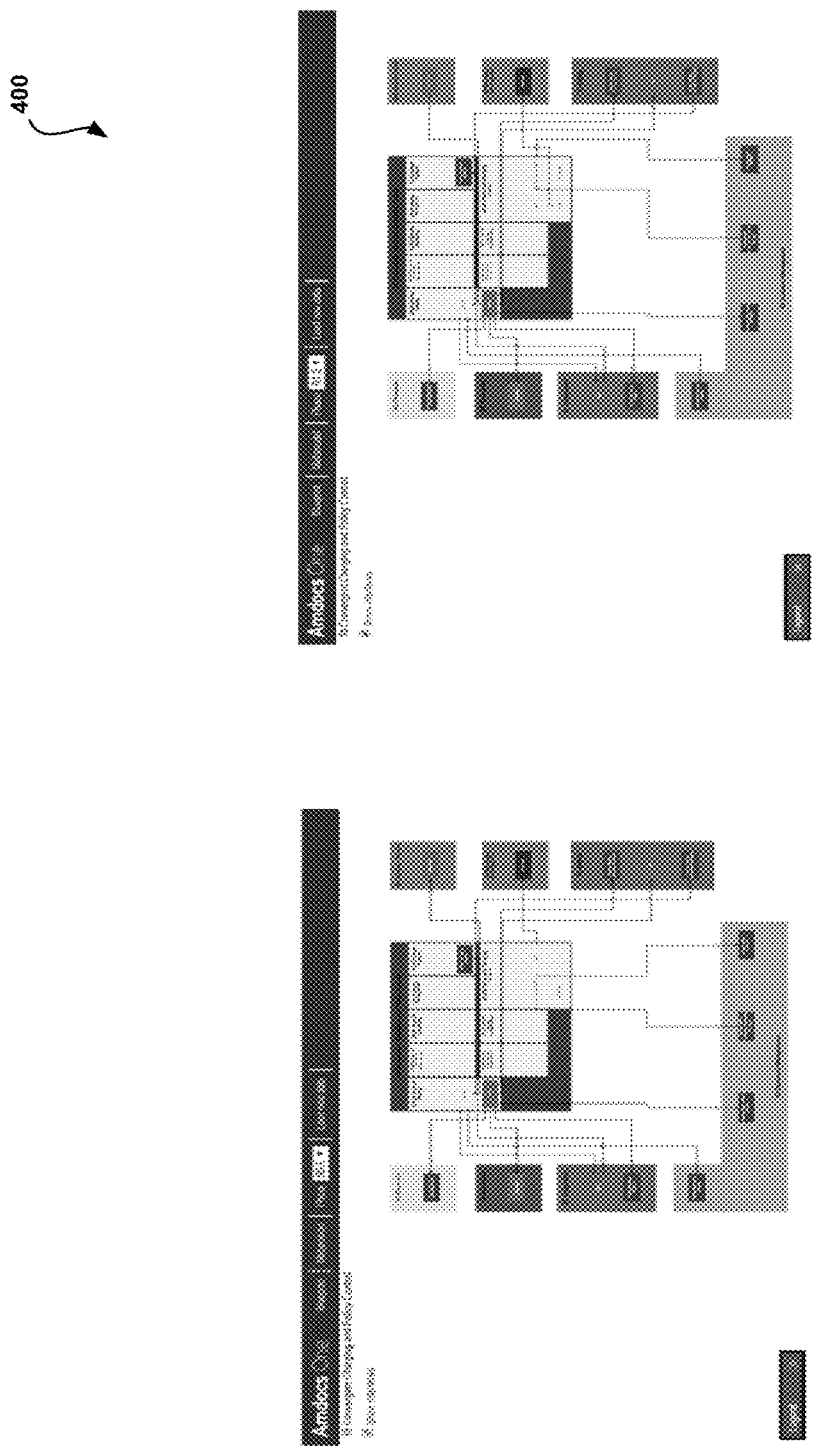
FIG. 4 shows an example illustrating releases of orientation of a given architecture, in accordance with one embodiment.

FIG. 4 shows an example 400 illustrating releases of orientation of a given architecture, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

Each release of the software timeline builds upon its preceding releases. The system enables tracking of the changes introduced in each release, therefore quickly assessing any impact of changes to the architecture. The system also creates a common language between the different project units (or software vendors) thus synchronizing between core developers, customization layer developers, implementers and operation teams who may alter architecture elements while in production (i.e. full Devops cycle).

Figure 5:
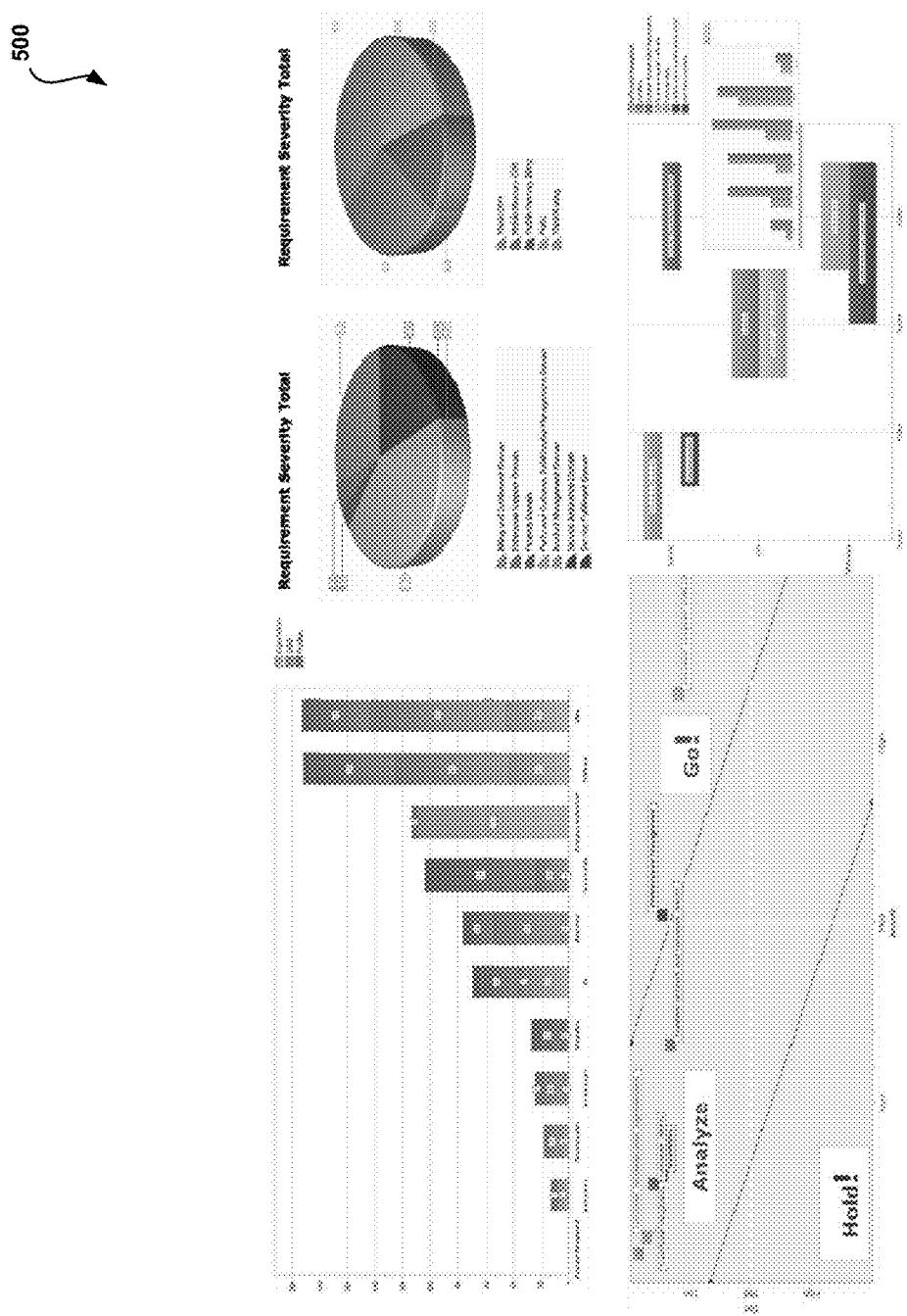
FIG. 5 shows a user interface illustrating the ability to govern the architecture through a dashboard utility, in accordance with one embodiment.

FIG. 5 shows a user interface 500 illustrating the ability to govern the architecture through a dashboard utility, in accordance with one embodiment. As an option, the user interface 500 may be implemented in the context of the details of the previous figures and/or any subsequent figure(s). Of course, however, the user interface 500 may be implemented in the context of any desired environment. Further, the aforementioned definitions may equally apply to the description below.

In one embodiment, a dashboard associated with the system may be equipped with predefined graphs and charts. Users of the system may also be able to define their own views and charts to share with the community.

For example, in the bottom left-hand corner of FIG. 5 the graph represents the set of recommendation, driven by an algorithm of the system, for implementation and/or development of certain modules in the system. This may be achieved by relating the contribution of each module/application to the business drivers and/or the KPI and/or the risks/risks categories, all of which may be represented in the architecture model and may be a part of the architecture connection network.

In this particular graph shown in FIG. 5, the systems that appear in the "Analyze" portion suggest that further analysis is required to reach an educated decision about the value of developing a module to the business. The "Go" portion, on the other hand, suggests that the effort of developing the contained modules is recommended as it presents low cost and high returns.

Figure 6:
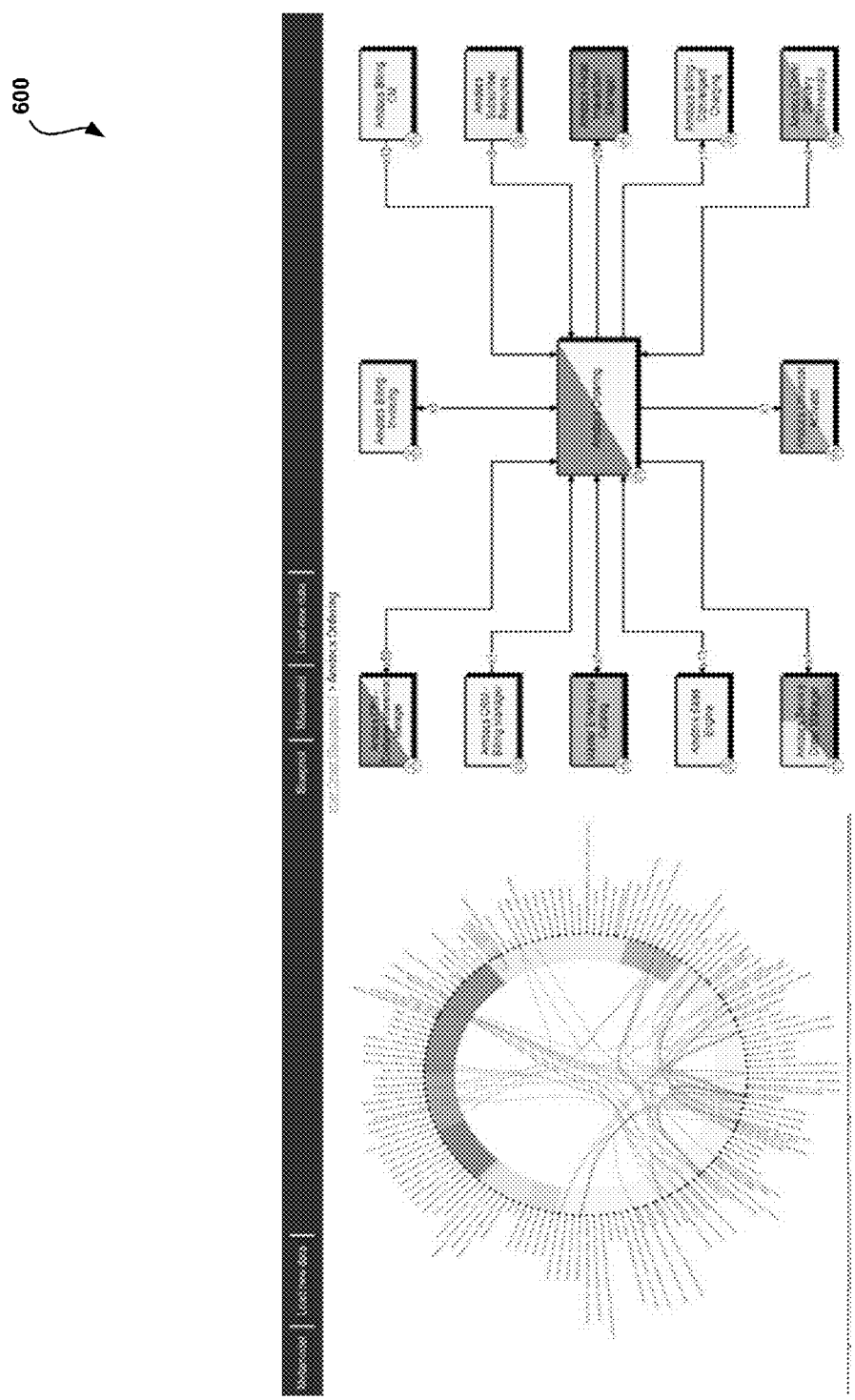
FIG. 6 shows a user interface illustrating visualization capabilities of the system, in accordance with one embodiment.

FIG. 6 shows a user interface 600 illustrating visualization capabilities of the system, in accordance with one embodiment. As an option, the user interface 600 may be implemented in the context of the details of the previous figures and/or any subsequent figure(s). Of course, however, the user interface 600 may be implemented in the context of any desired environment. Further, the aforementioned definitions may equally apply to the description below.

The system allows users to visualize the architecture, or parts of it, using multiple visualization formats. If a graphic format is used, the users may select from various pre-defined graphic layouts (e.g. network of elements, hierarchy, circular, etc.). In addition, users may select a list view. The list view may include a default view of elements defined by the MetaModel, hence representing user preferences. The system may also allow users to select to change to a list view according to their specific needs. For any selected visualization layout, the system may allow users to zoom into a specific element of the architecture while maintaining their visualization preferences.

Figure 7:
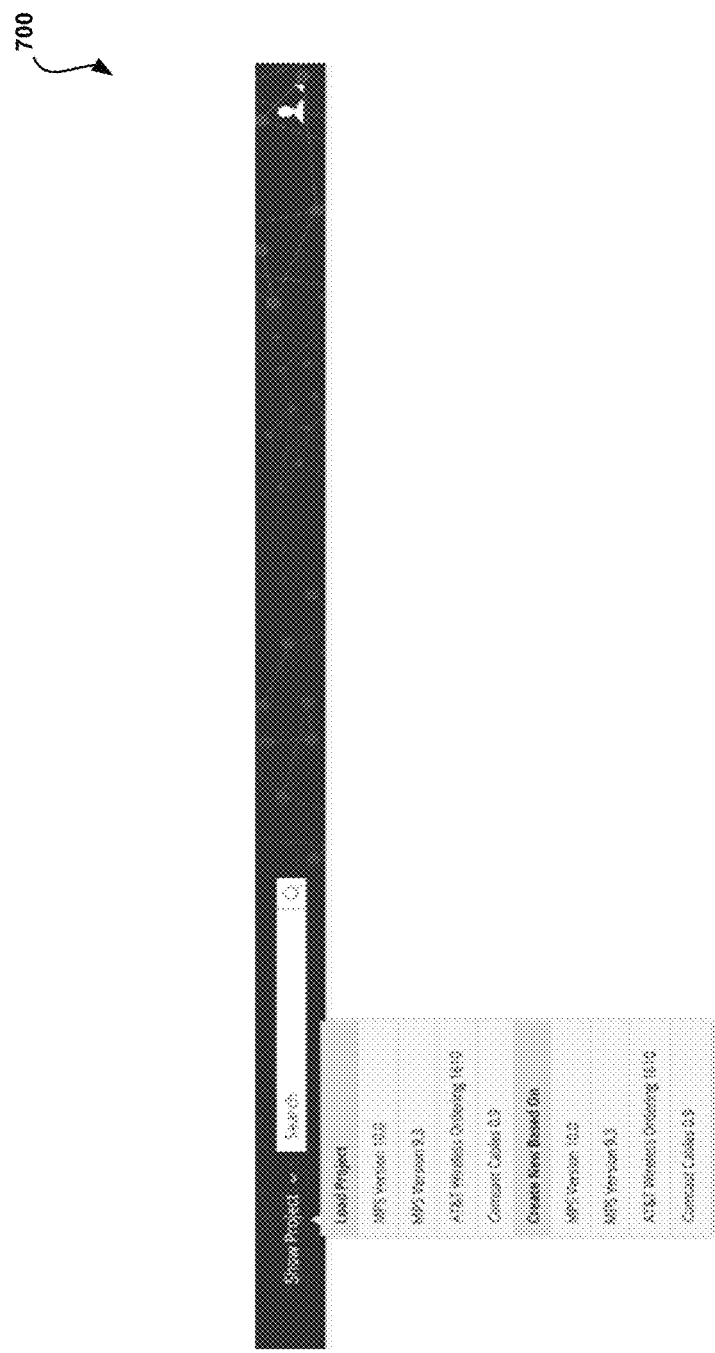
FIG. 7 shows a user interface illustrating a layered architecture approach, in accordance with one embodiment.

FIG. 7 shows a user interface 700 illustrating a layered architecture approach, in accordance with one embodiment. As an option, the user interface 700 may be implemented in the context of the details of the previous figures and/or any subsequent figure(s). Of course, however, the user interface 700 may be implemented in the context of any desired environment. Further, the aforementioned definitions may equally apply to the description below.

Architecture building requires a "production line" based approach. In this context, the first layer will be the core architecture. Core represents the building blocks of, for example, telecom products. Once the core layer is introduced and finalized, the system can build upon this layer and add/update the core building blocks. This is called the generic implementation layer.

Any updates to the core will not change the core itself. Rather, updates may be logged by the system as an additional layer to the core and may be saved and approached as such. Those two layers may then become the foundation for an additional layer called a "customer specific" layer that introduces the customers' architecture. There is no limit to the number of layers introduced to any given architecture. Users may view the architecture as if it is the only layer that exists for convenience. The system may validate that a user does not breech architecture completeness using the layered approach.

Figure 8:
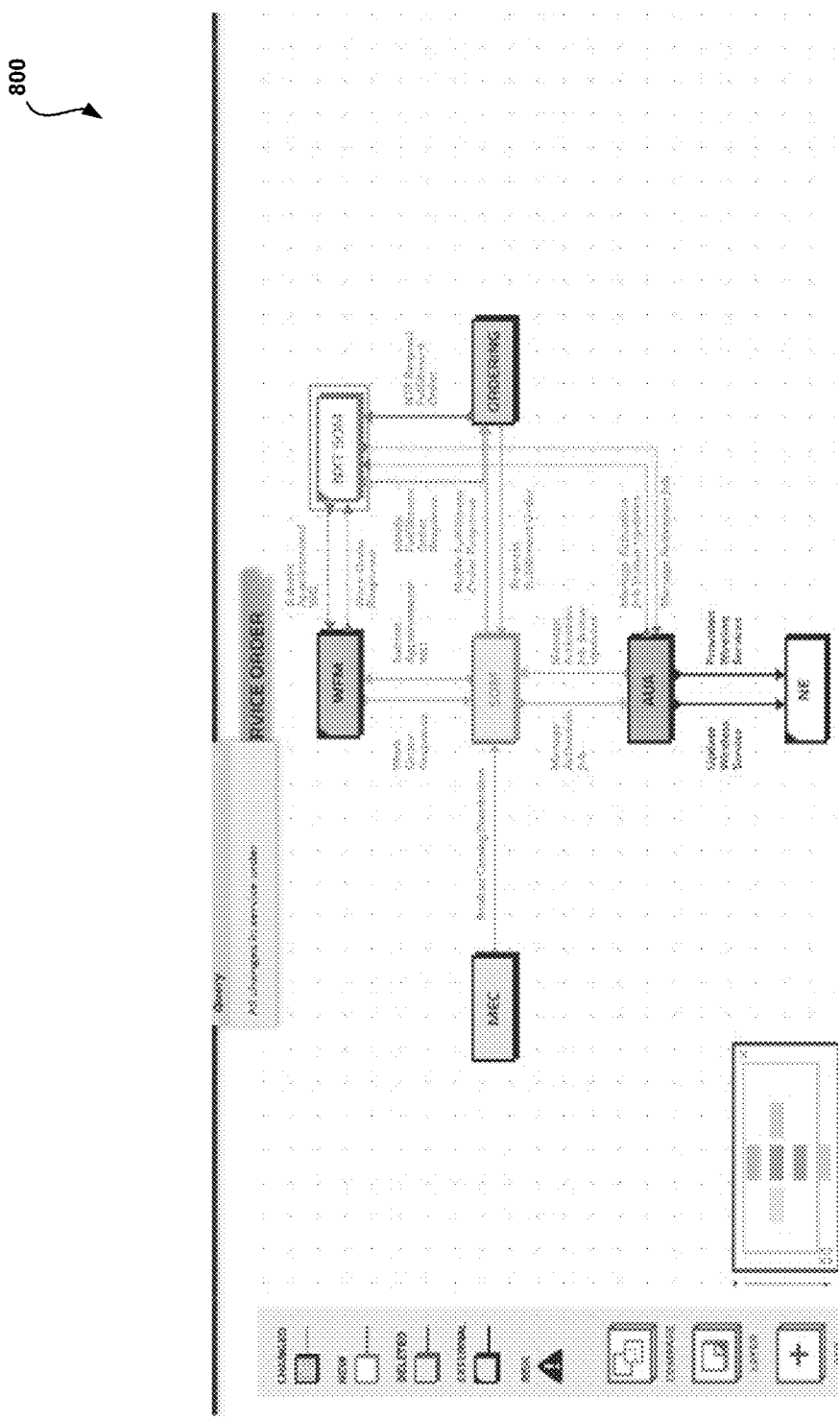
FIG. 8 shows a user interface illustrating super-impose functionality, in accordance with one embodiment.

FIG. 8 shows a user interface 800 illustrating superimpose functionality, in accordance with one embodiment. As an option, the user interface 800 may be implemented in the context of the details of the previous figures and/or any subsequent figure(s). Of course, however, the user interface 800 may be implemented in the context of any desired environment. Further, the aforementioned definitions may equally apply to the description below.

Users may need to compare between architecture elements across layers and releases. The system may allow super imposing (over laying) one release upon another to visualize differences between them in a detailed manner. The visualization may be done through graphics or list views, etc.

Figure 9:
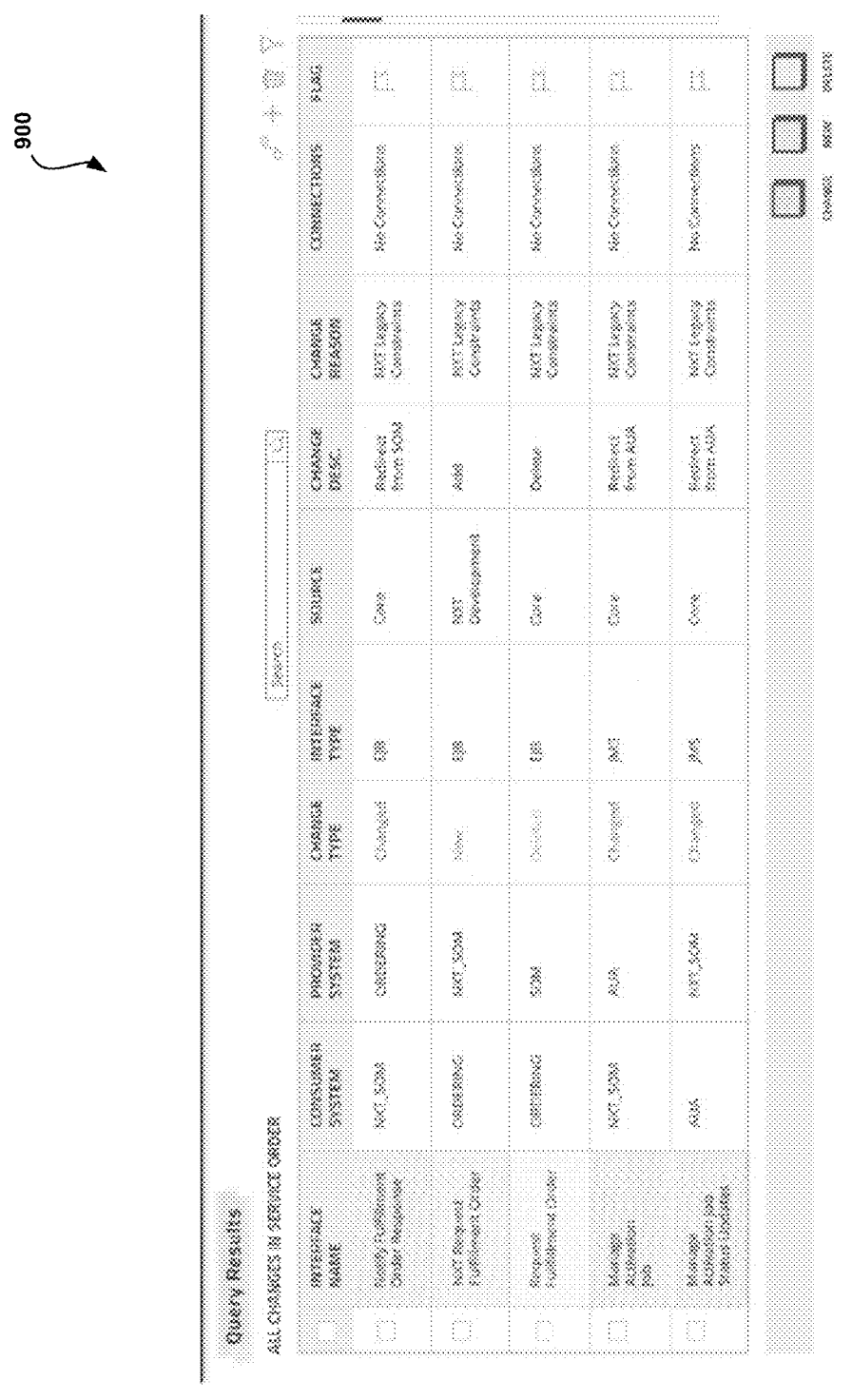

FIG. 9 shows a user interface 900 illustrating traceability features of the system, in accordance with one embodiment. As an option, the user interface 900 may be implemented in the context of the details of the previous figures and/or any subsequent figure(s). Of course, however, the user interface 900 may be implemented in the context of any desired environment. Further, the aforementioned definitions may equally apply to the description below.

The system may function such that each change, at any given point in time, is traced back to its origin (e.g. person or process).

Figure 10:
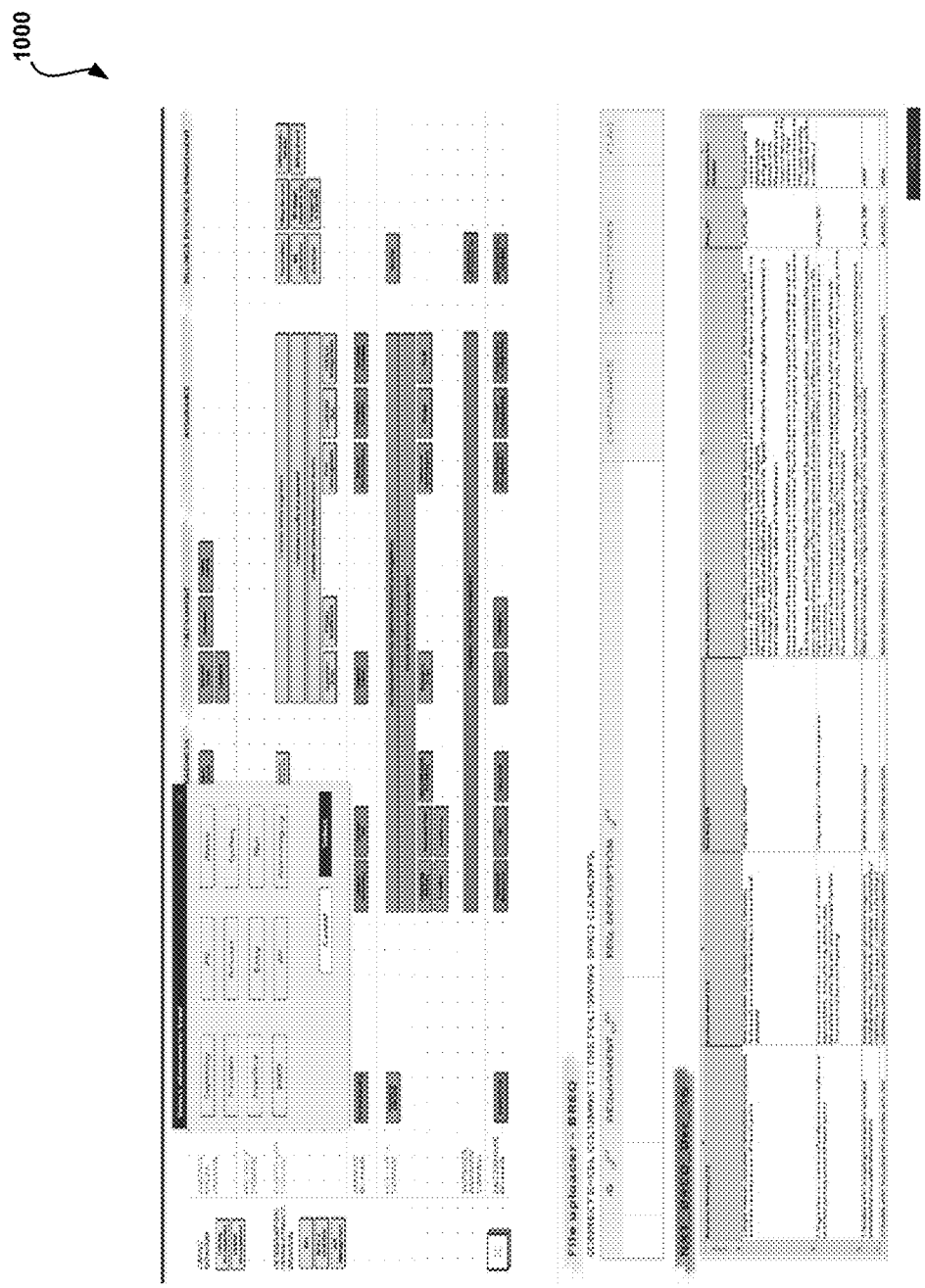
FIG. 10 shows a user interface illustrating a load utility of the system, in accordance with one embodiment.

FIG. 10 shows a user interface 1000 illustrating a load utility of the system, in accordance with one embodiment. As an option, the user interface 1000 may be implemented in the context of the details of the previous figures and/or any subsequent figure(s). Of course, however, the user interface 1000 may be implemented in the context of any desired environment. Further, the aforementioned definitions may equally apply to the description below.

In operation, the system may enable loading of data from an external source to its repositories.

Figure 11:
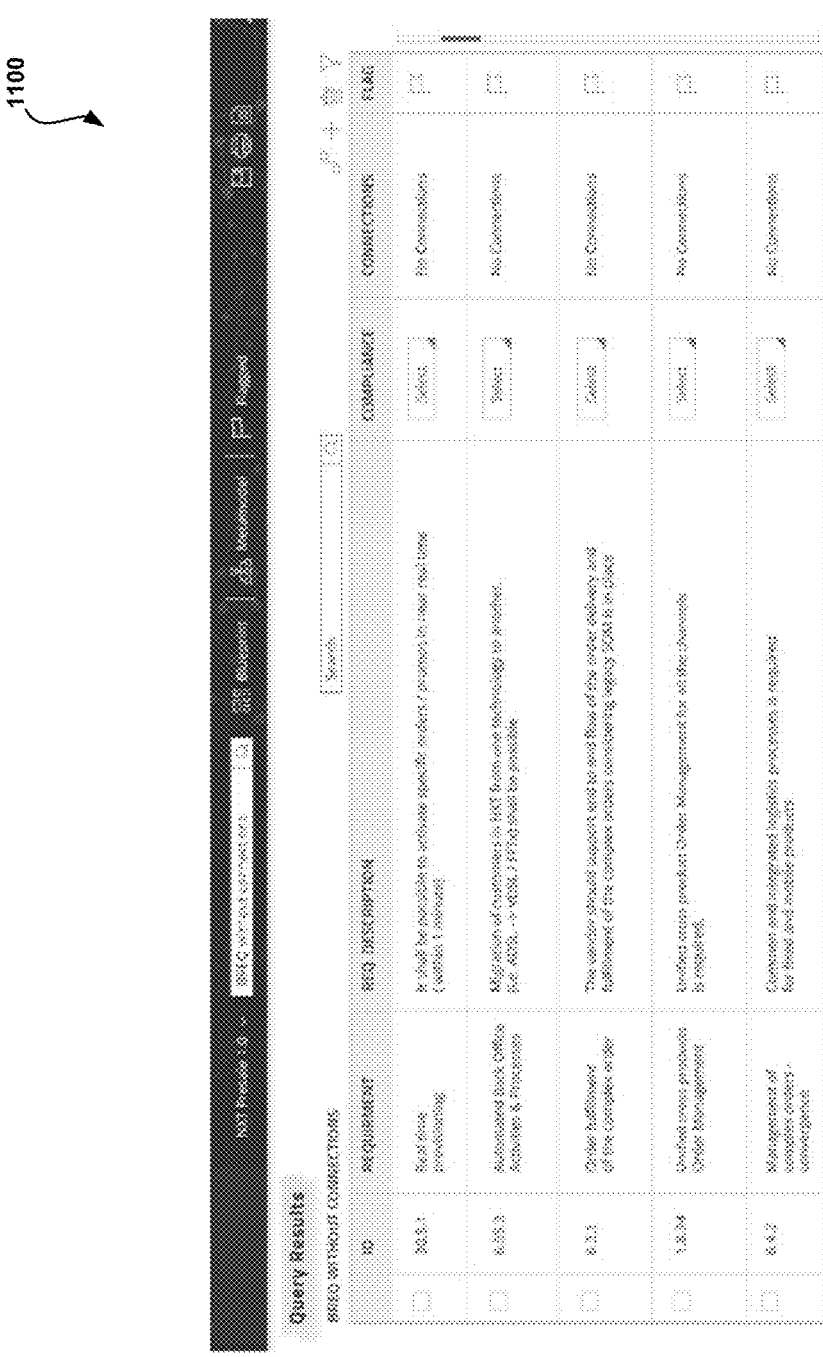
FIG. 11 shows a user interface illustrating query functionality of the system, in accordance with one embodiment.

FIG. 11 shows a user interface 1100 illustrating query functionality of the system, in accordance with one embodiment. As an option, the user interface 1100 may be implemented in the context of the details of the previous figures and/or any subsequent figure(s). Of course, however, the user interface 1100 may be implemented in the context of any desired environment. Further, the aforementioned definitions may equally apply to the description below.

In operation, the architecture may be represented by elements connected to create a network of associations. Users may use the system to query any element and explore its immediate connections as well as its $2^{nd}$, $3^{rd}$ and nth connection at any given time.

Figure 12:
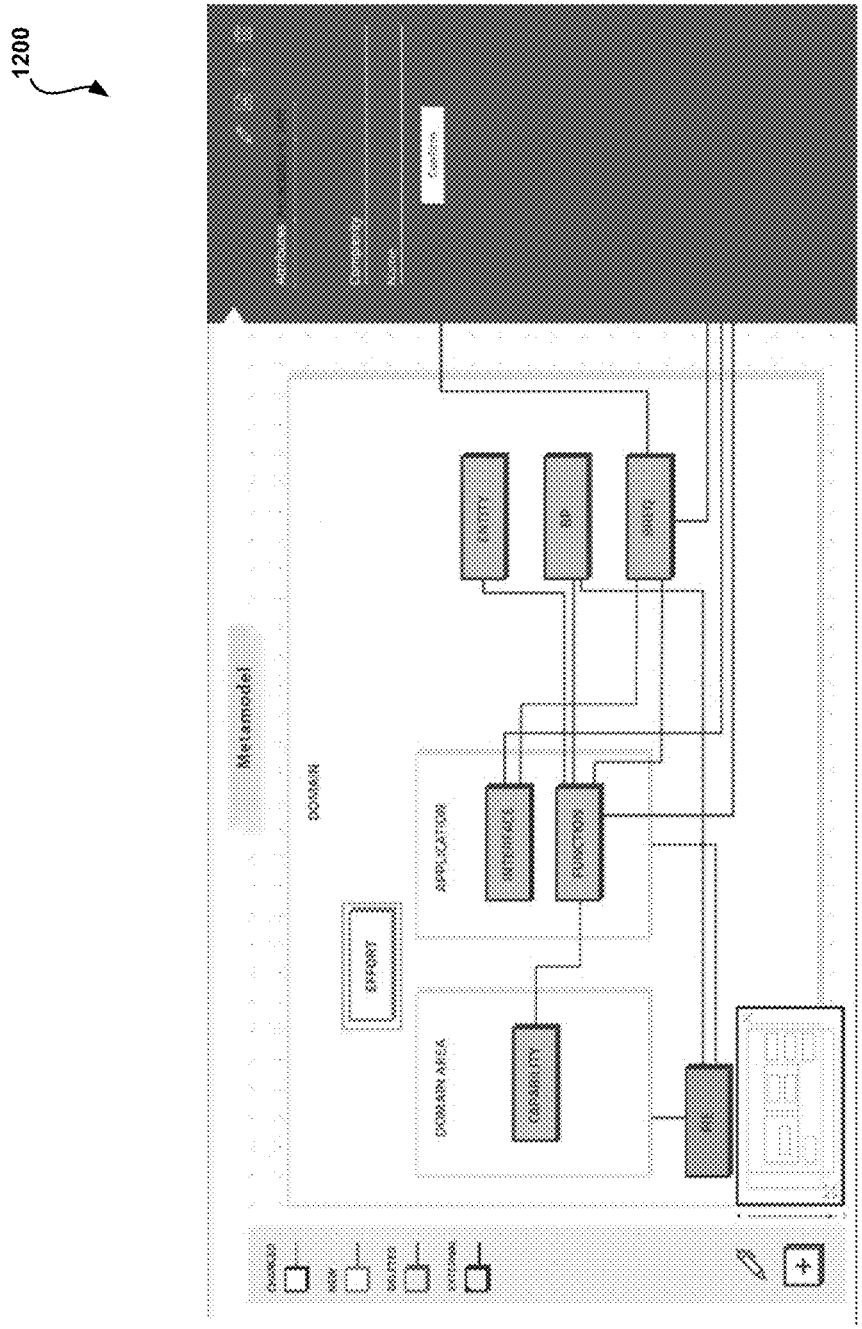
FIG. 12 shows a user interface illustrating a canvas of the system, in accordance with one embodiment.

FIG. 12 shows a user interface 1200 illustrating a canvas of the system, in accordance with one embodiment. As an option, the user interface 1200 may be implemented in the context of the details of the previous figures and/or any subsequent figure(s). Of course, however, the user interface 1200 may be implemented in the context of any desired environment. Further, the aforementioned definitions may equally apply to the description below.

Users may explore and experiment different architecture setups utilizing the system. This enables impact assessment prior to committing to a certain architecture structure.

Figure 13:
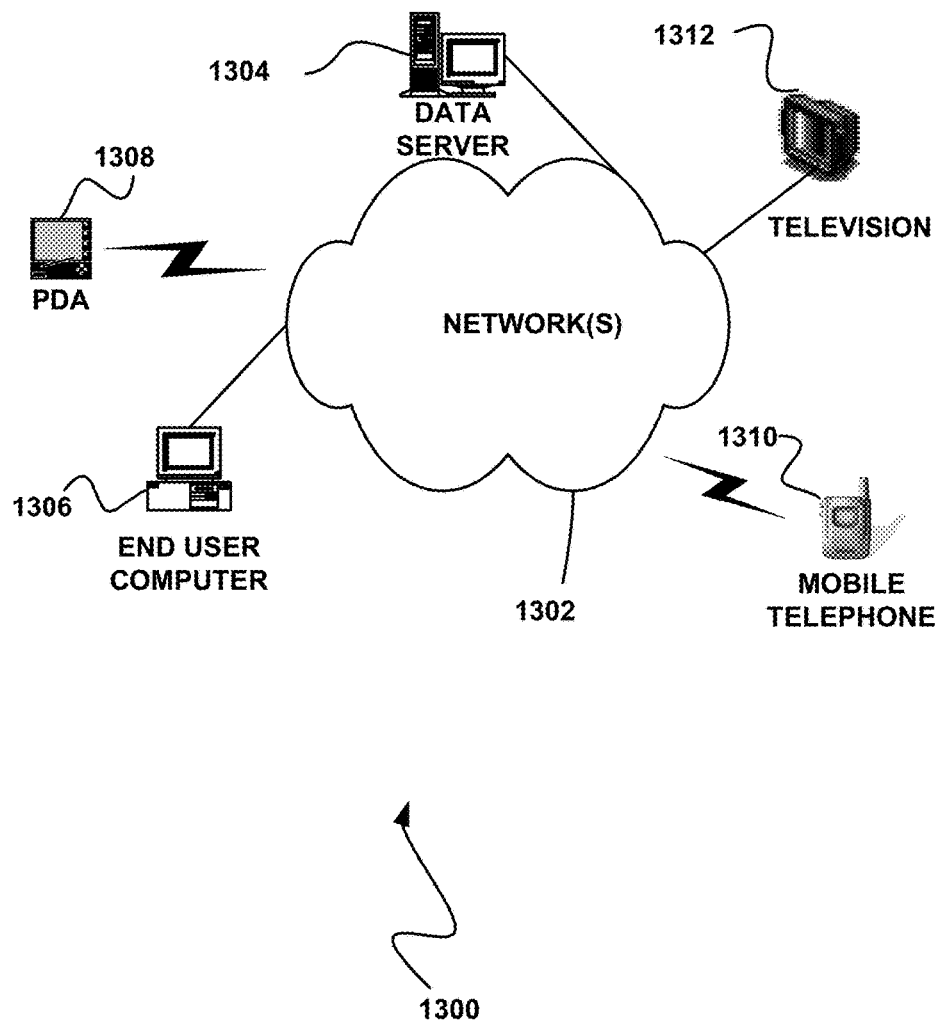
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1304 and an end user computer 1306 may be coupled to the network 1302 for communication purposes. Such end user computer 1306 may include a desktop computer, lap-top computer, and/or any other type of logic. Still yet, various other devices may be coupled to the network 1302 including a personal digital assistant (PDA) device 1308, a mobile phone device 1310, a television 1312, etc. In one embodiment, the network architecture 1300 may represent one or more cloud environments.

Figure 14:
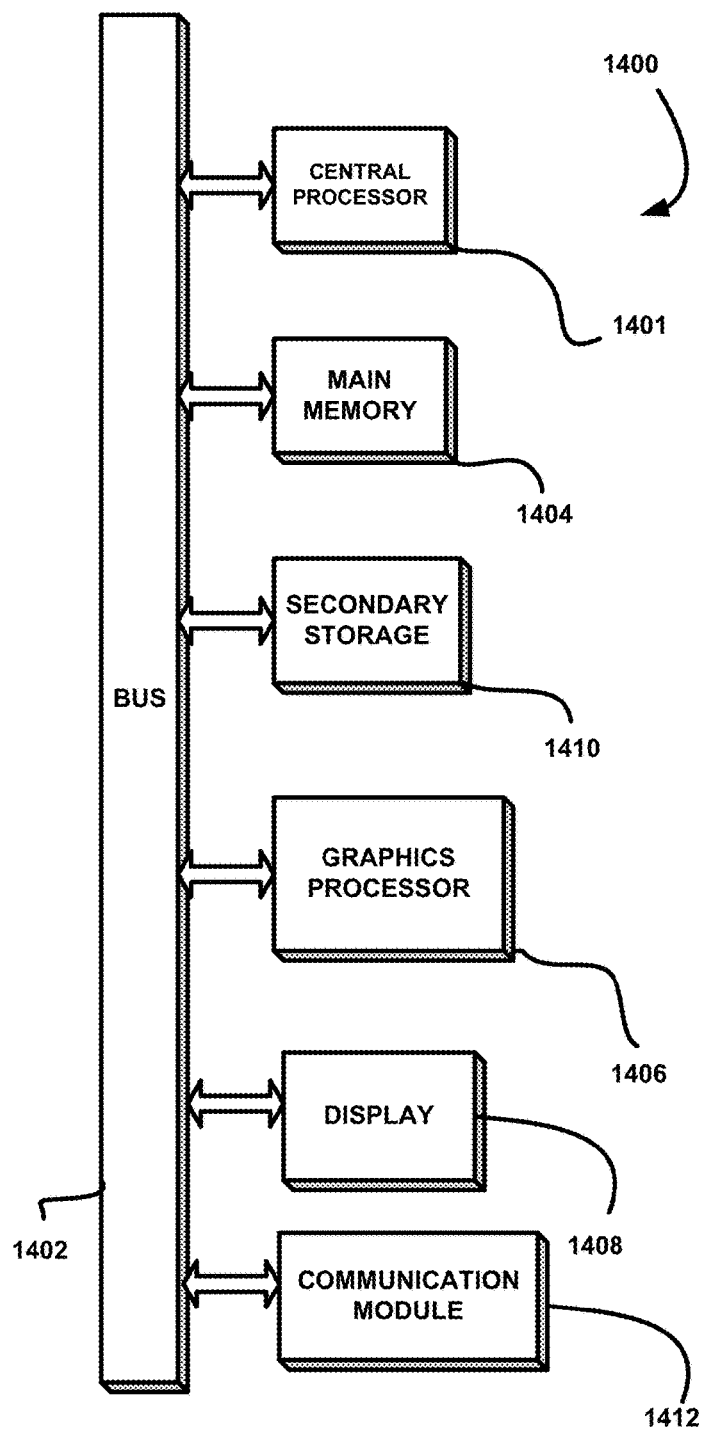
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1401 which is connected to a communication bus 1402. The system 1400 also includes main memory 1404 [e.g. random access memory (RAM), etc.]. The system 1400 also includes a graphics processor 1406 and a display 1408.

The system 1400 may also include a secondary storage 1410. The secondary storage 1410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1404, the secondary storage 1410, and/or any other memory, for that matter. Such computer programs, when executed, enable the system 1400 to perform various functions (as set forth above, for example). Memory 1404, storage 1410 and/or any other storage are possible examples of non-transitory computer-readable media.

The system 1400 may also include one or more communication modules 1412. The communication module 1412 may be operable to facilitate communication between the system 1400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a software project customized for a particular customer; receiving, by the system, software element information corresponding to software elements associated with the software project;

defining, by the system, a multi-layer architecture for the software project based on the software element information, the multi-layer architecture modeling inter-dependencies between the software elements, and layers of the multi-layer architecture including:

a first layer representing a core architecture that includes building blocks, a second layer built upon the first layer representing a generic implementation with updates to the building blocks, a third layer built on top of the second layer that is specific to the customer and that represents a customer architecture including customer customizations and implementation of the software project, and at least one additional layer built on top of the third layer corresponding to at least one updated release of the software project;

storing, by the system, the multi-layer architecture in a central architecture repository;

storing, by the system, associations between each business requirement of a plurality of business requirements and the software elements that cover each of the business requirements;

preventing, by the system, deletion of one or more of the software elements based on the inter-dependencies of the one or more of the software elements and based on one or more of the business requirements associated with the one or more of the software elements;

wherein the system provides a user interface for overlaying the at least one updated release of the software project to discover changes across a timeline.

2. The method of claim 1, wherein the software elements include one or more of applications, capabilities, functions, information data models, interfaces, service signatures, versions, software vendor creators, hardware elements, engines, and foundations.

3. The method of claim 1, wherein the system provides a visualization layer that highlights the inter-dependencies between the software elements.

4. The method of claim 1, wherein the system analyzes cross element impacts associated with the software elements for evaluating a proposed change associated with the multi-layer architecture.

5. The method of claim 1, wherein the software elements are loaded from one or more existing files.

6. A computer program product embodied on a non-transitory computer readable medium, comprising computer code for:

identifying, by a system, a software project customized for a particular customer;

receiving, by the system, software element information corresponding to software elements associated with the software project;

defining, by the system, a multi-layer architecture for the software project based on the software element information, the multi-layer architecture modeling inter-dependencies between the software elements, and layers of the multi-layer architecture including:

a first layer representing a core architecture that includes building blocks, a second layer built upon the first layer representing a generic implementation with updates to the building blocks, a third layer built on top of the second layer that is specific to the customer and that represents a customer architecture including customer customizations and implementation of the software project, and at least one additional layer built on top of the third layer corresponding to at least one updated release of the software project;

storing, by the system, the multi-layer architecture in a central architecture repository;

storing, by the system, associations between each business requirement of a plurality of business requirements and the software elements that cover each of the business requirements;

preventing, by the system, deletion of one or more of the software elements based on the inter-dependencies of the one or more of the software elements and based on one or more of the business requirements associated with the one or more of the software elements;

wherein the system provides a user interface for overlaying the at least one updated release of the software project to discover changes across a timeline.

7. The computer program product of claim 6, wherein the software elements include one or more of applications, capabilities, functions, information data models, interfaces, service signatures, versions, software vendor creators, hardware elements, engines, and foundations.

8. The computer program product of claim 6, wherein the system provides a visualization layer that highlights the inter-dependencies between the software elements.

9. The computer program product of claim 6, wherein the system analyzes cross element impacts associated with the software elements for evaluating a proposed change associated with the multi-layer architecture.

10. The computer program product of claim 6, wherein the software elements are loaded from one or more existing files.

11. A system, operable for:

identifying, by the system, a software project customized for a particular customer;

receiving, by the system, software element information corresponding to software elements associated with the software project;

defining, by the system, a multi-layer architecture for the software project based on the software element information, the multi-layer architecture modeling inter-dependencies between the software elements, and layers of the multi-layer architecture including:

a first layer representing a core architecture that includes building blocks, a second layer built upon the first layer representing a generic implementation with updates to the building blocks, a third layer built on top of the second layer that is specific to the customer and that represents a customer architecture including customer customizations and implementation of the software project, and at least one additional layer built on top of the third layer corresponding to at least one updated release of the software project;

storing, by the system, the multi-layer architecture in a central architecture repository;

storing, by the system, associations between each business requirement of a plurality of business requirements and the software elements that cover each of the business requirements;

preventing, by the system, deletion of one or more of the software elements based on the inter-dependencies of the one or more of the software elements and based on one or more of the business requirements associated with the one or more of the software elements;

wherein the system provides a user interface for overlaying the at least one updated release of the software project to discover changes across a timeline.

12. The system of claim 11, wherein the software elements include one or more of applications, capabilities, functions, information data models, interfaces, service signatures, versions, software vendor creators, hardware elements, engines, and foundations.

13. The system of claim 11, wherein the system provides a visualization layer that highlights the inter-dependencies between the software elements.

14. The system of claim 11, wherein the system analyzes cross element impacts associated with the software elements for evaluating a proposed change associated with the multi-layer architecture.

* * * * *